May 1, 1934. D. A. BATTISTA Re. 19,153

ICE CREAM CAKE AND METHOD OF MAKING SAME

Original Filed July 25, 1930

Inventor
DONALD A. BATTISTA.

Attorney

Reissued May 1, 1934 Re. 19,153

UNITED STATES PATENT OFFICE 19,153

ICE-CREAM CAKE AND METHOD OF MAKING SAME

Donald Alec Battista, Philadelphia, Pa.

Original No. 1,786,387, dated December 23, 1930, Serial No. 470,680, July 25, 1930. Application for reissue December 22, 1932, Serial No. 648,521

6 Claims. (Cl. 107—54)

The present invention relates to an ice cream cake, and the method of preparing the same.

One of the primary objects of the invention is to prepare a cake of the character indicated which is capable of being distributed without losing its shape some time after preparation.

Another purpose is to so prepare the cake that a substantial portion of the ice cream or ice cream sherbet is absorbed within the pores thereof.

Another feature is the preparation of the article indicated in such a manner that moisture present in the cake upon completion of the baking thereof, is retained therein so that the pores of the cake permit absorption of the ice cream when spread between successive layers of the cake.

With these and other objects in view, which will appear as the description of the invention proceeds, reference is made to the drawing attached hereto and forming part of the disclosure, and in which, Fig. 1 is a perspective view of an ordinary cake as baked;

The first step in the process is the baking of the cake in a substantially conventional manner. The usual ingredients such as butter, sugar, flour, milk, egg white and baking powder are mixed in proper proportions, the resulting batter being placed in pans, and the cake baked to a temperature of approximately 400° Fahrenheit. When the cake has been properly baked it is taken from the oven and immediately placed in a refrigerator to cool. This is a very important step, in that the moisture and flavor are retained within the cake walls which permits the ice cream to be absorbed within the cake pores. If, on the other hand, the cake were allowed to cool gradually, some of the moisture would be evaporated from the cake walls and the ice cream subsequently applied, would be absorbed within the walls and the whole product would be soggy and unsatisfactory.

Figure 1:
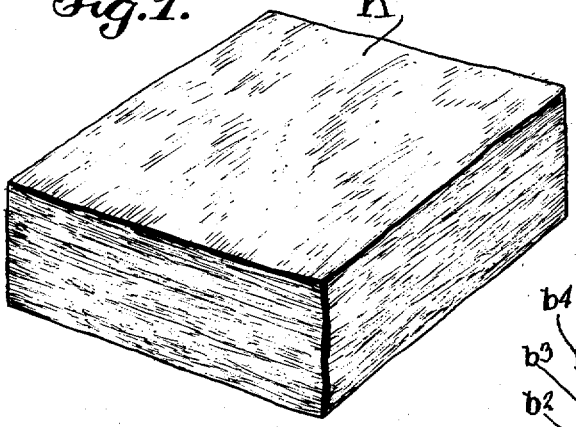
Figure 3:
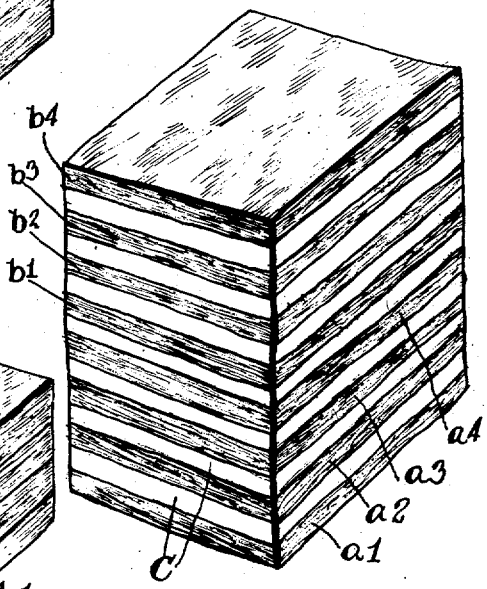
Fig. 3 is a sectional view showing the relation of the respective layers and the manner of placing the ice cream therebetween.
Figure 2:
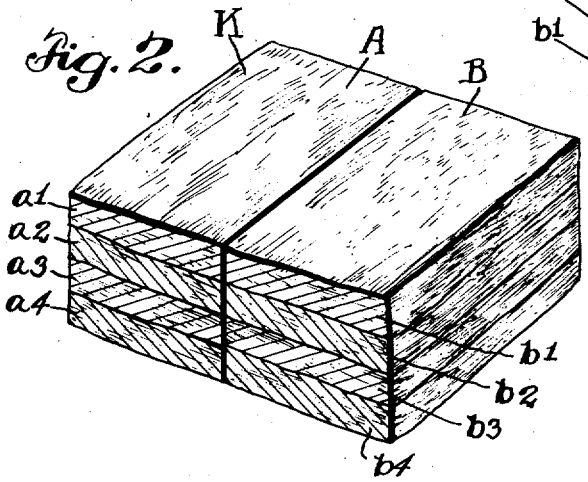
Fig. 2 is also a view in perspective showing the cake after cutting.
Figure 4:
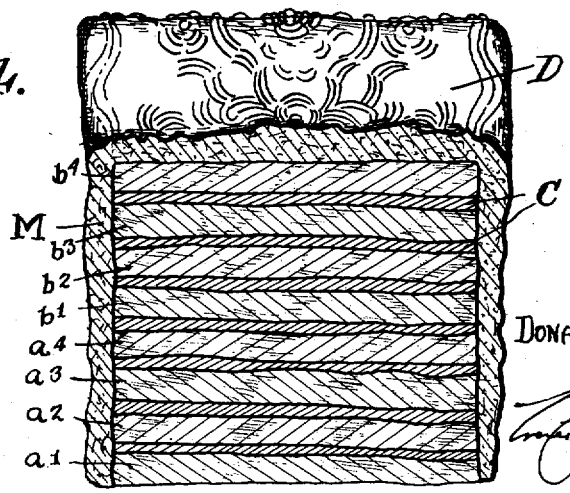
Fig. 4 is a vertical sectional view showing the completed product.

After cooling, the cake is removed from the refrigerator and is as shown by K in Fig. 1, with a thickness of approximately one and one-half inches. The article is next cut vertically into two equal parts A and B, and each of the latter sliced transversely into equal layers $a^1$, $a^2$, $a^3$, $a^4$, $b^1$, $b^2$, $b^3$, $b^4$. These layers are now superimposed so as to form eight layers as shown in Figs. 2 and 3.

Next follows the step of inserting ice cream C between the successive layers $a^1$, $a^2$, $a^3$, $a^4$, $b^1$, $b^2$, $b^3$, $b^4$. The ice cream or ice cream sherbet is in a semi-frozen condition or mix so as to be readily spread between adjacent layers. It might be here stated, that it is essential that a substantial part of the ice cream or sherbet be absorbed within the pores of the cake. This result is obtainable if the baked cake is cooled as outlined above, then, sliced into thin layers and a filler of ice cream applied of substantially the same thickness as each layer. On the completion of the above step the product is as in Fig. 3.

Finally, the entire cake is covered with an edible layer of material M, such as whipped cream. The cream is beaten evenly, only enough sugar being added to obtain a consistency such that the cream commences to thicken. This may be accomplished by adding approximately four ounces of sugar to one quart of cream. Flavoring may be embodied in the coating and only so much is added as not to curdle the latter, after which the coating is spread, as with a pallet knife, over the top and sides of the layers of cake and ice cream to completely and effectively cover the same. The top may be decorated as at D, after which the cake is placed into a freezer or refrigerator and is frozen for from three to eight hours at a temperature of approximately zero degrees. The resulting product may then be removed, wrapped in wax or tissue paper to protect it from the atmosphere and placed into boxes which are labeled, and thus ready for distribution. Best results are obtained by spreading the ice cream over the cake layers, the thickness of the ice cream filler being substantially the same as a cake layer. It will be found, on examination of the completed product, that approximately one-half of the ice cream filler has been absorbed within the cake pores. Experimentation has shown that if the layers of cake are too thick, that is to say, of greater thickness than the ice cream filler, the final product when frozen, as indicated above, will be decidedly "tough" and difficult to cut.

When the ice cream cake is prepared as outlined above, the layers of cake and ice cream will freeze together, solid, and will be in good condition for consumption for quite a period of time after removal from the final refrigeration. Accordingly, it will be seen that there has been produced a novel product constituting a decided advance in this particular line of inventive endeavor.

Various minor changes may be made in the specific details of the process above outlined, without departing from the spirit of the invention, and it is my intention to be limited only as may become necessary by the scope of the appended claims.

I claim:

1. A process of preparing ice cream cake, which consists in baking a cake, immediately cooling the same rapidly, then cutting the cake into thin layers, spreading thin fillers of ice cream mix between the layers, and subsequently freezing the whole, whereby a substantial part of the ice cream will be absorbed into the pores of the cake.

2. A process for preparing ice cream cake, which consists in baking a cake, immediately cooling the same rapidly from its hot condition, then slicing the cake into equal layers, spreading ice cream mix between the layers and covering the same with an edible coating, and finally freezing the whole.

3. A process for preparing ice cream cake, which consists in preparing the cake, rapidly cooling the same while hot, dividing the cake into a plurality of similar thin layers, filling ice cream between the layers, each filler of ice cream being substantially of the same thickness as the cake layer, covering the sides and top of the cake with a thick edible coating, and finally freezing the whole, so that in the resulting product a substantial part of the ice cream has been absorbed within the cake pores.

4. A frozen ice cream cake, comprising a plurality of superposed thin layers of cake having ice cream mix absorbed within the pores of adjacent cake layers, an edible coating covering the aforesaid superposed layers, said cake, ice cream mix and edible coating all being in a frozen state.

5. The process of producing bonded ice cream layer cake which comprises preparing baked cake with the pores thereof open at opposite faces of the cake, spreading a substantial uniform layer of semi-frozen ice cream mix over a porous face of the cake, bringing an uncoated face of the cake into contact with the layer of mix whereby the mix will be substantially uniformly introduced into the body of the superposed layers, and thereafter subjecting the whole to a freezing temperature whereby the mix will be frozen within the body of the cake and the layers bonded together.

6. A frozen ice cream layer cake comprising alternate layers of ice cream and cake in which the ice cream extends a substantial distance into the body of superposed layers of cake, through the pores of such layers, forming a frozen union of cake and ice cream on both sides of a layer of cake.

DONALD ALEC BATTISTA.